United States Patent [19]
Vijan et al.

[11] 3,990,544
[45] Nov. 9, 1976

[54] DISC BRAKE INCLUDING RADIALLY REMOVABLE BRAKE SHOE RETAINING DEVICE

[75] Inventors: Arun S. Vijan, Troy; Bruce D. Anderson, Berkley, both of Mich.

[73] Assignee: Rockwell International Corporation, Pittsburgh, Pa.

[22] Filed: June 4, 1975

[21] Appl. No.: 583,593

[52] U.S. Cl. ............................. 188/72.4; 188/73.6; 188/206 R
[51] Int. Cl.² ......................................... F16D 55/18
[58] Field of Search ................ 188/73.6, 73.3, 71.1, 188/72.4, 72.5, 73.5, 71.3, 206, 73.4

[56] References Cited
UNITED STATES PATENTS

| | | | |
|---|---|---|---|
| 2,531,341 | 11/1950 | Meador, Jr. | 188/72.4 X |
| 2,799,367 | 7/1957 | Dotto | 188/72.4 X |
| 2,921,650 | 1/1960 | Butler | 188/73.6 |
| 3,357,524 | 12/1967 | Smith | 188/73.6 |
| 3,695,398 | 10/1972 | Crawford | 188/73.6 |
| 3,841,445 | 10/1974 | Rinker | 188/73.5 |
| 3,841,446 | 10/1974 | Gravel, Jr. | 188/73.3 X |
| 3,865,215 | 2/1975 | Burgdorf | 188/73.6 |

FOREIGN PATENTS OR APPLICATIONS

| | | | |
|---|---|---|---|
| 158,496 | 6/1953 | Australia | 188/71.1 |
| 1,242,220 | 8/1971 | United Kingdom | 188/73.6 |

*Primary Examiner*—Trygve M. Blix
*Assistant Examiner*—Douglas C. Butler

[57] ABSTRACT

A disc brake including a pair of brake shoes freely floating for axial movement within an open ended brake housing or caliper. A retaining member is secured adjacent each end of the caliper by radially accessible bolts. The retaining members project into detents formed at each end of each brake shoe to support the brake shoes within the caliper. The retaining members are movable out of the detents and out of alignment with the brake shoe ends after disengagement from the radially accessible bolts. The brake shoes are then accessible and removable through the open end of the caliper.

9 Claims, 5 Drawing Figures

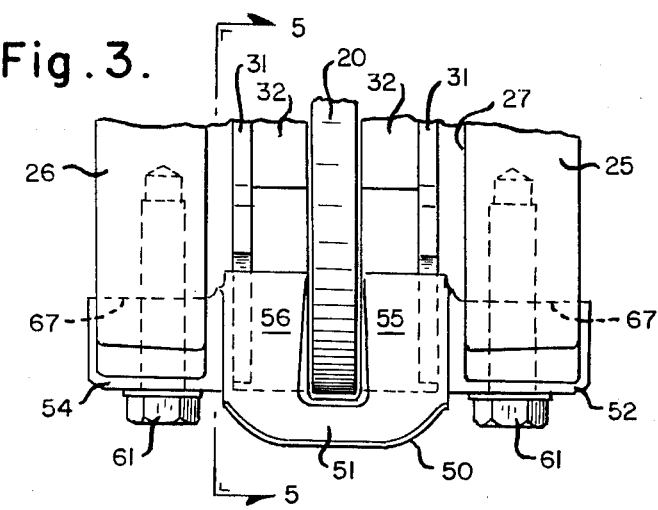
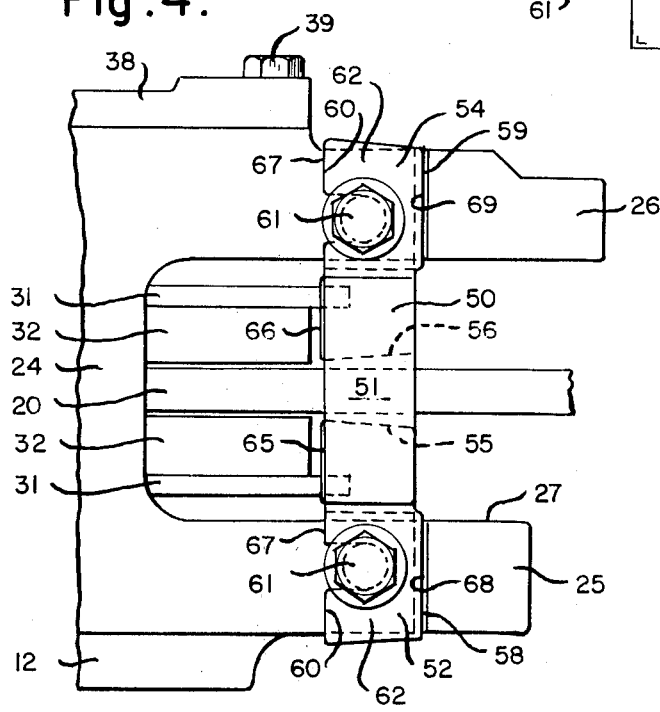
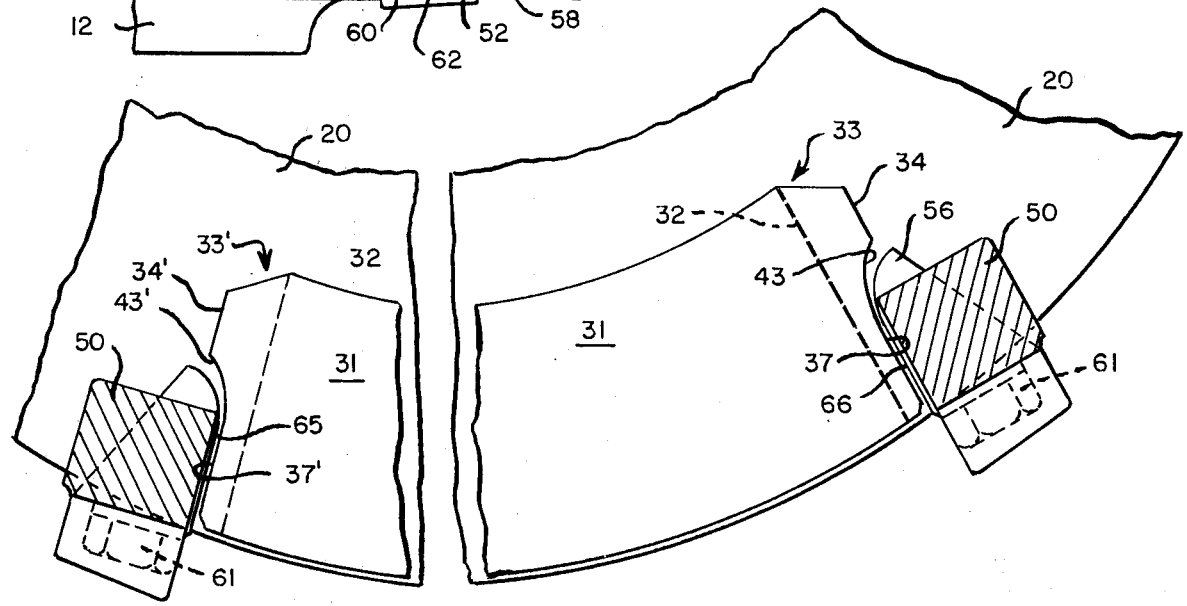

DISC BRAKE INCLUDING RADIALLY REMOVABLE BRAKE SHOE RETAINING DEVICE

BACKGROUND OF THE INVENTION

This invention is directed to a disc brake and more specifically, to a disc brake including brake shoe retaining means which provide for ready access to and removal of the brake shoes.

In order to inspect and remove brake shoes in conventional drum type brake systems, it is usually necessary to remove the wheel and brake drum assembly to gain access to the brake shoes. In disc type brake systems, the brake shoes are usually carried by a housing or caliper secured to the axle inboard of the wheel assembly. In many vehicles there is sufficient open space in the vicinity of the caliper to provide access for the purpose of inspecting, removing and/or possibly relining the brake shoes.

However, in other vehicles the access space is so limited that it is difficult to gain access to the means removably mounting the brake shoes. Even when the mounting means are accessible, many such means are removable in an axial direction and often there is insufficient space to permit complete removal without first moving the wheel or other components of the wheel and axle assembly. This may require rotation of the wheel to move a structural wheel rib or tire tread out of the way or removing an adjacent component.

Accessibility for maintenance purposes is particularly difficult in large off-highway type vehicles. The wheel and axle assemblies of these vehicles include massive components and large tires which leave little open space, are difficult to rotate and may require special equipment if they have to be removed. These difficulties may be even further compounded in off-highway equipment which employ a planetary type drive axle with planetary gear sets mounted axially outboard of the brake.

Replacement or relining of brake shoes is part of the regular maintenance program that must be periodically performed to insure safe and satisfactory operation of a vehicle. Thus it may readily be understood that if the brake shoes and linings are not readily accessible and removable that ordinary maintenance will result in lengthly downtime and increased maintenance costs, both of which increase in accordance with the degree of difficulty encountered in gaining access to, removing and replacing the brake shoes.

Moreover, in view of the difficulties previously encountered, some owners and operators of off-highway equipment are reluctant to attempt to replace or reline brake shoes in the field and thus incur the additional expense of moving the vehicle to a maintenance area.

SUMMARY OF THE INVENTION

The present invention avoids many of the foregoing problems and related expenses by providing a disc brake in which the brake shoes are readily accessible and removable for relining or replacement without removing the caliper or moving other components of the vehicle wheel and axle assembly adjacent to the brake.

The present invention is a disc brake including a rotatable disc, a support, and a housing fixed to the support. The housing extends in spaced relation over the periphery of the disc and radially inward adjacent opposite sides of the disc. The housing is open ended and includes power means for axially moving brake shoes. A retaining member is secured to the housing adjacent each open end. Each retaining member includes projections which extend radially inward on each side of the disc into partial alignment with the ends of the brake shoes to prevent the brake shoes from moving through one of the open ends of the housing. In one embodiment, the projections extend into detents provided at each end of each brake shoe to support the brake shoes within the housings. The brake shoe retaining means are engaged and secured to the housing by radially accessible movable means. The brake shoe retaining means are movable out of the detents and out of alignment with the brake shoes after disengagement from the radially accessible movable means. The brake shoes may then be withdrawn through the open end of the housing.

DESCRIPTION OF THE DRAWINGS

In the drawings, wherein like reference numerals refer to like parts:

FIG. 3 is a view taken along the line 3—3 of FIG. 1;

FIG. 4 is a view taken along the line 4—4 of FIG. 1; and

FIG. 5 is a sectional view taken along the line 5—5 of FIG. 4;

DESCRIPTION OF THE INVENTION

Figure 1:
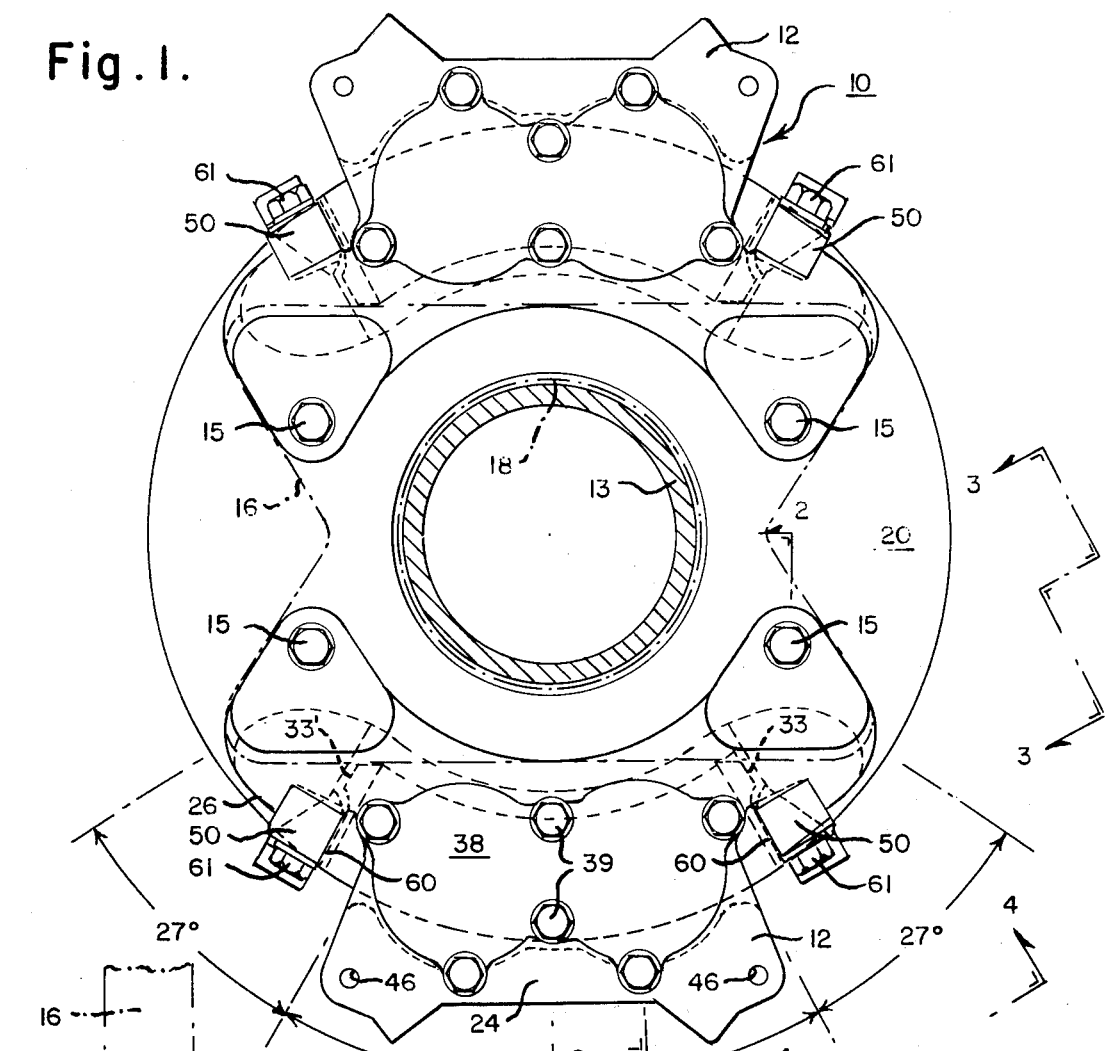
FIG. 1 is a view showing the axially inboard side of a disc brake system in elevation.
Figure 2:
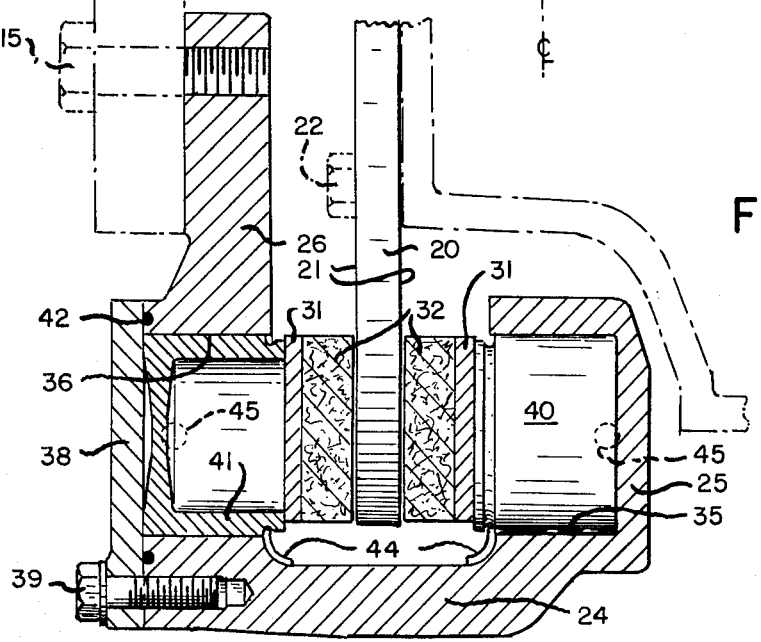
FIG. 2 is a sectional view taken along the line 2—2 of FIG. 1.

Referring now to the drawings and, in particular, to FIGS. 1 and 2, there is shown a disc brake assembly generally designated by the numeral 10. The assembly 10 includes a pair of housings or calipers 12. The calipers 12 are located diametrically opposite each other and are fixed by bolts 15 to the outboard surface 14 of a support member 16 shown by dot dash lines. The support member 16 is a plate of substantially uniform thickness having a circular center opening 18. The support member is fixed to a vehicle axle housing 13 either by welding or by mechanical means fixing the member 16 to a flange which may be welded to or formed integral with the vehicle axle housing.

The axle housing 13 projects through the opening 18 of member 16 and rotatably mounts a wheel hub shown by dot dash lines in FIG. 2. A rotor or disc 20 providing oppositely facing friction braking surfaces 21 is secured for rotation with the wheel hub by stud and nut assemblies 22.

The calipers 12 shown at the top and bottom of FIG. 1 are identical. The caliper 12 shown at the bottom of FIG. 1 will be described in detail with the understanding that the caliper 12 shown at the top of FIG. 1 is of the same structure.

As best shown in FIG. 2 the caliper 12 is channel shaped in cross-section having a web 24 and legs 25 and 26. The web 24 is spaced from and extends axially across the periphery of the disc 20. The legs 25 and 26 extend radially inward on opposite sides of the disc and are spaced axially outwardly from the friction braking surfaces 21. The caliper 12 is open at 27 between the legs 25, 26 at each end of the caliper.

The legs 25, 26 of the caliper 12 extend beyond the web 24. As shown by the curved chain line in FIG. 1 the web emcompasses only about 60° of arc while the ends of the legs 25, 26 encompass an additional 27° of arc at each end of the caliper 12.

A pair of brake shoes 31 carrying pads 32 of frictional lining material; for example, asbestos pads; are mounted within the caliper 12 with the oppositely facing surfaces of the pads 32 and friction braking surfaces 21 of the rotor in close proximity. The brake shoes 31, as will be described below, are floatingly mounted within the caliper 12 for movement parallel to the axle housing 13 to press the pads 32 into contact with the friction braking surfaces 21.

The caliper legs 25 and 26 are respectively formed to provide a pair of cylindrical bores 35, 36, in the central portion of each leg. The bores 35 are closed by the leg 25. The bores 36 are closed by a cover plate, 38 secured by bolts 39 to the leg 26. The bores 35, 36 respectively mount pistons 40, 41 bearing against the brake shoes 31.

The pistons 40, 41 are fluid pressure actuated. Hydraulic fluid is introduced between the pistons 40, 41 and the caliper leg 25 or cover plate 38 to move the pistons toward the disc 20. A seal 42 and piston rings not shown, are provided to prevent hydraulic fluid leakage. A passage 45 and ports 46 provide fluid communication with the cylinder bores 35, 36 to bleed air from the system. A dust cover 44 prevents dust and other foreign matter from entering the cylindrical bores 35, 36.

The brake shoes are suspended in the caliper between a pair of retaining members 50. The retaining members 50 are secured to the extended portions of the caliper legs 25, 26 adjacent the edges of the web 24 at each open end 27 of the caliper 12.

Each retaining member 50, as shown in FIGS. 3 through 5, is an elongated unitary member having a central portion 51 radially spaced from and extending axially across the periphery of the disc 20. The end portions 52, 54 of each retaining member are substantially cubical in form and comprise mounting lugs which are received in radially outwardly open grooves 67 provided to the extended portions of the legs 25, 26 of caliper 12. The end portions 52, 54 of retaining member 50 are slotted through the surface 60 to receive bolts 61, the hexagonal heads of which engage the radially outer surface 62 of the retaining member end portions 52, 54 and secure the member 50 to the caliper 12. The lateral surfaces 58, 59 of each end portion 52, 54 of the retaining members 50 respectively abut the oppositely facing surfaces 68, 69 of the caliper leg grooves 67 when the retaining member is engaged by the bolts 61 and secured to the caliper 12.

Each retaining member 50 also includes a pair of radially inwardly extending projections 55, 56 intermediate the central portion 51 and each respective end portion 52, 54 of the retaining member. The projections 55, 56 extend inwardly on each side of the disc 20 with the surfaces 65, 66 in alignment with the radially outer surfaces 37, 37' of the spaced ends 33, 33' of the brake shoes 31.

The ends 33, 33' of a brake shoe 31 are reverse images of one another. The elements comprising the edge 33 of a brake shoe 31 and the relationship of those elements to the adjacent retaining member 50 will be described with reference to FIG. 6. The opposite or left edge 33' is of substantially identical, although reverse, structure and the corresponding elements of the left edge will be identified by prime reference numerals.

The end 33 of brake shoe 31 is comprised of two off-set surfaces 34, 37 joined by a curved, third surface 43. The inner ends of the surfaces 65, 66 of the projecting 55, 56 may be formed to about the same or slightly less curvature than the oppositely facing curved surfaces 43 or 43'.

The arcuate length of the brake shoes between the end surfaces 37 37' is slightly less than the arcuate distance between the oppositely facing surfaces 60 of retaining members 50 received in the grooves 67 provided at each open end of the caliper 12. This provides a clearance space permitting limited movement of the brake shoes 31 relative to the caliper between the two retaining members.

The arcuate length of the brake shoes between the brake shoe end surfaces 34, 34' is slightly greater than the arcuate distance provided between the oppositely facing surfaces 60 of the two retaining members 50. This combination of the off-set end surfaces 34 and 37 joined by the surface 43, and the off-set end surfaces 34' and 37' joined by the surface 43', provides a detent at each edge 33, 33' of each brake shoe 31.

The surfaces 65, 66 of the retaining member projections 55, 56 are inclined at an angle converging near the center of the brake assembly. The projections 55, 56 extend radially inward between the off-set surfaces 34, 37 and 34', 37' provided at each end of the brake shoes 31. The projections 55, 56 of the retaining members at each end of the caliper thus constitute oppositely disposed abutments which project into the detents formed at each end 33, 33' of the brake shoes and floatingly mount the brake shoes for limited movement in the caliper 12.

Movement of the brake shoes radially outward relative to the caliper is limited by abutment of the curved surfaces 43, 43' with the oppositely disposed curved surfaces portions of the retaining member projections 55, 56. Movement of the brake shoes radially inward relative to the caliper is limited by abutment of both of the brake shoe end surfaces 37, 37' with the oppositely facing surfaces 65, 66 of the retaining members 50. Movement of the brake shoes longitudinally relative to the caliper is limited by abutment of one of the brake shoe end surfaces 37 or 37' with the oppositely facing surface 65 or 66 of a retaining member 50. The brake shoes 31 and pads 32 are freely axially movable into frictional contact with the rotor braking surfaces 21 while the retaining members 50 prevent substantial movement of the brake shoes relative to the calipers in all other directions.

The operation of the disc brake of the present invention will now be described. When the brake is applied, the pistons 40, 41 move the brake shoes 31 and pads 32 into frictional contact with the braking surfaces 21 of the disc 20. Frictional contact between the pads 32 and disc 20 will move the end surfaces 37 or 37' of the brake shoes 31 into abutment with the radially inwardly extending surfaces 65, 66 of a retaining member 50 at one end of the caliper 12. The retaining member 50 will prevent further movement of the brake shoes 31 and transfer torque from the brake shoes to the abutting surfaces 68, 69 of the caliper 12.

The retaining members 50 also reinforce the extended portions of the legs 25, 26 of the caliper and, in cooperation with the web 24, restrain the legs 25, 26 from axial expansion in reaction to the hydraulic load applied by the pistons 40, 41.

The retaining members 50 are readily removable by loosening the radially accessible bolts 61 and permit easy removal of the brake shoes 31 for replacement or relining.

To remove the brake shoes, the bolts 61 securing one retaining member 50 are loosened and radially withdrawn a sufficient distance to permit the end portions 52, 54 of that retaining member to clear the abutting surfaces 68, 69 and be removed from the caliper leg grooves 67. As the retaining member is removed, the projections 55, 56 are withdrawn from the brake shoe detents and the surfaces 65, 66 are withdrawn from their position in partial alignment with the ends of the brake shoes. The brake shoes 31 and pads 32 may then be manually withdrawn through the opening 27 at the end of the caliper 12 from which the retaining member has been removed.

It should be noted that the heads of the bolts 61 are both radially accessible and radially outwardly movable to permit removal of the retaining member. Although the bolts 61 may be removed completely, complete removal is not necessary since the slotted openings through the retaining member surface 60 permit removal of the retaining member as the retaining member is disengaged from the securing means.

This invention thus proves a disc brake and a disc brake shoe support in which the brake shoes may be readily and easily removed for replacement or relining without removing the caliper or moving other components of the vehicle wheel and axle assembly adjacent to the brake.

The invention may be embodied in other forms without departing from the spirit or essential characteristics thereof. The foregoing description is therefore to be considered as illustrative and not restrictive, the scope of the invention being defined by the appended claims and all changes which come within the meaning and range of equivalency of the claims are therefore intended to be embraced thereby.

We claim:

1. A disc brake comprising:
   a rotatable disc,
   a stationary support,
   a housing spaced from and extending across the periphery of said disc and radially inward on opposite sides of said disc, said housing being open ended and fixed to said support,
   brake shoes on opposite sides of said disc within said housing, said brake shoes supporting pads of friction material adjacent opposite sides of said disc and being movable through the open ends of said housing,
   means for axially moving said brake shoes to press said pads against said opposite sides of said disc,
   brake shoe retaining means adjacent at least one of said open ends of said housing, said retaining means being partly aligned with a portion of each of said brake shoes to prevent said shoes from moving through said one open end of said housing, and
   means engaging and securing said retaining means to said housing, said retaining means being radially movable out of alignment with said brake shoes after disengagement with said securing means.

2. The disc brake defined by claim 1 wherein said means engaging and securing said retaining means to said housing are movable radially outward relative to said housing.

3. The disc brake defined by claim 1 wherein said retaining means is comprised of a unitary member extending axially across the periphery of said disc and said member is spaced radially outward from said periphery and extends inwardly on opposite sides of said disc into alignment with a portion of each of said brake shoes.

4. The disc brake defined by claim 1 wherein said retaining means are provided adjacent each open end of said housing and each of said means comprises a unitary member spaced radially outwardly from and extending across the periphery of said disc and a pair of projections respectively extending radially inward on opposite sides of said disc into partial alignment with an end portion of one of said brake shoes.

5. The disc brake defined by claim 4 wherein said brake shoes include a detent formed at each respective end, thereof and said projections extend into said detents.

6. The disc brake defined by claim 4 wherein said housing includes radially extending surfaces at each side of each open end of said housing and said unitary members are secured to said housing with lateral surfaces of each respective member abutting the radially extending surfaces at that end of said housing.

7. A disc brake comprising:
   a rotatable disc,
   a stationary support,
   a housing spaced from and extending across the periphery of said disc and radially inward on opposite sides of said disc, said housing being fixed to said support,
   brake shoes on opposite sides of said disc within said housing, said brake shoes supporting pads of friction material adjacent opposite sides of said disc and including a detent at each end of each shoe,
   means for axially moving said brake shoes to press said pads against said opposite sides of said disc,
   means supporting said brake shoes in said housing, said supporting means comprising a member adjacent each end of the oppositely disposed ends of said brake shoes, each said member including a pair of projections extending radially inward on each side of said disc into said detents provided to adjacent ends of said brake shoes, and
   means securing each said member to said housing, each said member being radially movable to withdraw said projections from said detents after disengagement with said securing means.

8. The disc brake defined by claim 7 wherein said detents at each end of said brake shoes are comprised of two laterally off-set edge surfaces joined together by a third surface.

9. A disc brake shoe support comprising an elongated housing having spaced legs extensions joined by a web and said leg extensions extending beyond said web at both ends of said housing, radially outwardly open and laterally aligned grooves in said leg extensions at both ends of said housing, and a brake shoe retaining member at each said end of said housing having oppositely disposed end portions seated in said laterally aligned grooves, each said retaining member including spaced intermediate portions extending radially inwardly relative to said housing and said legs and a central portion joining said spaced intermediate portions of said retaining member.

* * * * *